(12) United States Patent
Zhou

(10) Patent No.: US 9,419,675 B2
(45) Date of Patent: Aug. 16, 2016

(54) ISOLATION TUNERS FOR DIRECTIONAL COUPLERS

(71) Applicant: Applied Wireless Identifications Group, Inc., Morgan Hill, CA (US)

(72) Inventor: Liming Zhou, Lake Hiawatha, NJ (US)

(73) Assignee: Applied Wireless Identifications Group, Inc., Morgan Hill, CA (US)

( * ) Notice: Subject to any disclaimer, the term of this patent is extended or adjusted under 35 U.S.C. 154(b) by 60 days.

(21) Appl. No.: 14/195,689

(22) Filed: Mar. 3, 2014

(65) Prior Publication Data

US 2014/0248837 A1 Sep. 4, 2014

Related U.S. Application Data

(60) Provisional application No. 61/772,482, filed on Mar. 4, 2013.

(51) Int. Cl.
| | |
|---|---|
| *H04B 7/00* | (2006.01) |
| *H04B 1/44* | (2006.01) |
| *H01P 5/18* | (2006.01) |
| *H04B 1/04* | (2006.01) |
| *H04B 1/10* | (2006.01) |
| *H04B 1/525* | (2015.01) |

(52) U.S. Cl.
CPC .. *H04B 1/44* (2013.01); *H01P 5/18* (2013.01); *H04B 1/0458* (2013.01); *H04B 1/10* (2013.01); *H04B 1/525* (2013.01)

(58) Field of Classification Search
CPC .................................. H01P 5/18; H04B 1/525
USPC ................................................ 455/41.1, 41.2
See application file for complete search history.

(56) References Cited

U.S. PATENT DOCUMENTS

| | | | |
|---|---|---|---|
| 5,359,331 A | 10/1994 | Adler | |
| 6,369,603 B1 * | 4/2002 | Johnston et al. | 324/754.31 |
| 7,855,617 B2 | 12/2010 | Cheung et al. | |
| 8,111,640 B2 | 2/2012 | Knox | |
| 8,508,296 B1 * | 8/2013 | Mustafa et al. | 330/124 R |
| 2007/0206705 A1 | 9/2007 | Stewart | |
| 2010/0069011 A1 | 3/2010 | Carrick et al. | |
| 2010/0120368 A1 | 5/2010 | Smith | |
| 2013/0027273 A1 * | 1/2013 | Kuwajima et al. | 343/850 |

OTHER PUBLICATIONS

Kim et al., "A Passive Circulator for RFID Application with High Isolation using a Directional Coupler," Proceedings of the 36th European Microwave Conference, Sep. 2006, Manchester, UK, pp. 196-199.

(Continued)

*Primary Examiner* — Eugene Yun
(74) *Attorney, Agent, or Firm* — Zilka-Kotab, PC

(57) ABSTRACT

A device according to one embodiment includes a variable-capacitor-tuned isolation tuning circuit having a directional coupler having an input port, an output port, an isolation port, and a coupling port. The variable-capacitor-tuned isolation tuning circuit also has and a tunable capacitor coupled in shunt to the coupling port of the directional coupler.

8 Claims, 8 Drawing Sheets

(56) References Cited

OTHER PUBLICATIONS

Lim et al., "Balanced Directional Coupler Structure with Insensitive Isolation for Load Impedance," Proceedings of the 38th European Microwave Conference, Oct. 2008, pp. 1280-1283.

Zou et al., "Development of a Wide Turning Range MEMS Tunable Capacitor for Wireless Communication Systems," Electron Devices Meeting, 2000, IEDM'00, Technical Digest, International, IEEE, 2000, pp. 1-4.

\* cited by examiner

ISOLATION TUNERS FOR DIRECTIONAL COUPLERS

RELATED APPLICATIONS

This application claims priority from U.S. Provisional Patent Application No. 61/772,482 filed on Mar. 4, 2013, which is herein incorporated by reference.

FIELD OF THE INVENTION

The present invention relates to Radio Frequency (RF) communication devices, and more particularly, this invention relates to circuitry to reduce the transmission leakage to the reception channel of radio systems.

BACKGROUND

Back-scattering detection systems, including frequency modulated continuous wave (FMCW) radars and radio frequency identifications (RFID) readers, simultaneously transmit an RF carrier wave and receive backscattered radio waves through their antennas. However, the transmitted and received signals for a transceiver may overlap in terms of frequency spectrum, as the received signals may have a frequency separation too small to be easily filtered. Therefore, the leading transmitted signal becomes a potential blocking signal to the back-scattered signal at the receiver front-end, as the back-scattered signals from the target object may be much smaller in amplitude than the transmitted signals.

One type of back-scattering detection system includes a bi-static RFID reader. Bi-static RFID readers have separated transmitting and receiving antennas. The transmitting circuitry (e.g., a modulator, power amplifier, transmitting antenna, etc.), does not share the same physical signal path with the receiving circuitry (e.g., a demodulator, low noise amplifier, receiving antenna, etc.). Physical separation between transmitting and receiving antennas may be employed to reduce the leakage of transmitting carrier to the receiving front-end RF circuitry.

Another type of back-scattering detection system includes mono-static RFID readers, which use one antenna for both transmission and reception. It is desirable to keep the transmission leakage at a low level in a mono-static back-scatter reception system since the simultaneous operation of transmitter and receiver is enabled by a shared antenna. In a mono-static RFID reader a circulator may be used to determine the direction of the transmitting carrier wave and arriving back-scattered radio signal for detection. Alternatively, directional couplers may also be used in lieu of circulators due to their cost advantage. Therefore, the antenna, the coupler (or the circulator), and connecting cables therebetween are preferably shared by the transmitter and receiver.

Unlike bi-static readers, whose leakage factors are mostly determined by the isolation of their antennas, the transmission leakage at the receivers of a mono-static RFID reader is mostly limited by the imperfect reflection coefficient of the shared antenna, transmission line, coupler, terminator, and/or circulator. Therefore, a higher level of transmission leakage is likely to be observed on a mono-static reader.

The transmission to reception leakage of a directional coupled based mono-static reader is affected not only by the fixed components of the RF hardware, but also by the variable RF components including the temperature-related component variation, the bend or twist of RF cables and components, the degradation of wire connection due to deformation or oxidization, or any other damage of components due to the environment. Moreover, any movement of objects near the antenna at the installation site also affect the impedance of antenna, thereby further altering the transmission to reception leakage ratio. The environmental effect of the mono-static RFID reader is a significant source of degradation of the transmission to reception leakage.

To overcome the forgoing disadvantages, various embodiments described and/or suggested herein preferably include circuitry to reduce the transmission leakage at the receiver, e.g., in back-scatter detection radio systems.

BRIEF SUMMARY

A device according to one embodiment includes a variable-capacitor-tuned isolation timing circuit having a directional coupler having an input port, an output port, an isolation port, and a coupling port. The variable-capacitor-tuned isolation tuning circuit also has and a tunable capacitor coupled in shunt to the coupling port of the directional coupler.

A Radio Frequency transmitting device according to another embodiment includes a variable-capacitor-tuned isolation tuning circuit having a directional coupler having an input port, an output port, an isolation port, and a coupling port. The variable-capacitor-tuned isolation timing circuit also has a tunable capacitor coupled in shunt to the coupling port of the directional coupler. The Radio Frequency transmitting device further includes a controller configured to set a capacitance value of the tunable capacitor based on a frequency transmitted by the device.

Other aspects and embodiments of the present invention will become apparent from the following detailed description, which, when taken in conjunction with the drawings, illustrate by way of example the principles of the invention.

DETAILED DESCRIPTION

Figure 1:
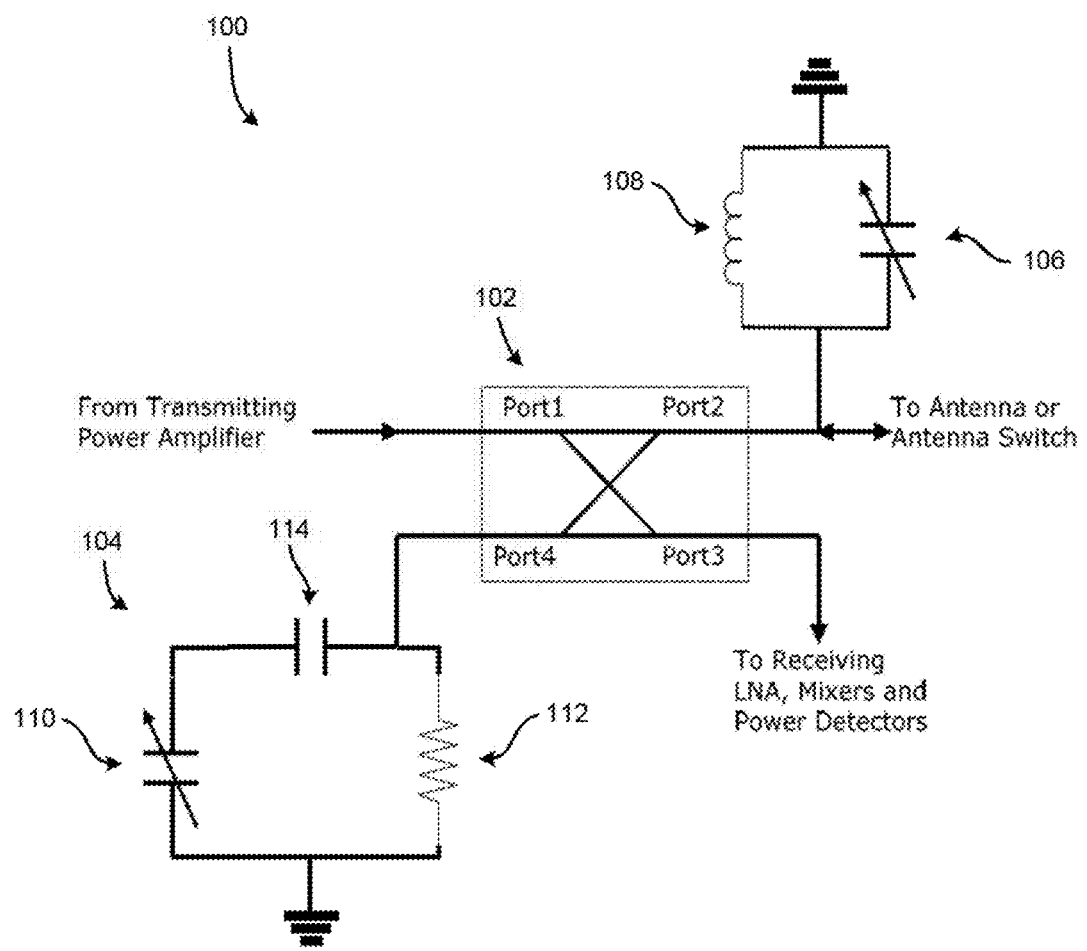
FIG. 1 is a circuit diagram of an isolation tuning circuit according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Illustrative examples of RFID systems, including RFID tags and readers, are described in U.S. patent application Ser. No. 11/367,061 filed Mar. 3, 2006 which is incorporated by reference. Such RFID systems may be used with various embodiments described and/or suggested herein.

In one general embodiment, a device includes a variable-capacitor-tuned isolation tuning circuit having a directional coupler having an input port, an output port, an isolation port, and a coupling port. The variable-capacitor-tuned isolation tuning circuit also has and a tunable capacitor coupled in shunt to the coupling port of the directional coupler.

In another general embodiment, a Radio Frequency transmitting device includes a variable-capacitor-tuned isolation tuning circuit having a directional coupler having an input port, an output port, an isolation port, and a coupling port. The variable-capacitor-tuned isolation tuning circuit also has a tunable capacitor coupled in shunt to the coupling port of the directional coupler. The Radio Frequency transmitting device further includes a controller configured to set a capacitance value of the tunable capacitor based on a frequency transmitted by the device.

The transmission to reception leakage of a directional coupled based mono-static reader is affected not only by the isolation parameter of the directional coupler, but also by its connected RF components including terminators, antennas, cables and/or connectors. Any objects near the antenna at the installation site or environmental variation may also affect the impedance of an antenna, thus change the transmission to reception leakage ratio. In sharp contrast, various embodiments described and/or suggested herein preferably include circuitry to reduce the transmission leakage at the receiver, e.g., in back-scatter detection radio systems.

As mentioned above, a circulator may be used to determine the direction of the transmitting carrier wave and arriving backscattered radio signal for detection. Alternatively, directional couplers may also be used in lieu of circulators due to their cost advantage. However, directional couplers compatible with various embodiments may not be ideal, and will thus usually have a certain limitation to how much isolation they provide. Moreover, as noted above, in real installations, the antenna is subject to various types of environmental mismatches, e.g., due to RF reflective and/or absorbing objects in a vicinity of the antenna. Reflected outgoing signals may be directed back to the antenna, then to an isolation port (e.g., see Port 3 of FIG. 1). Further, each antenna has a bandwidth, and it is difficult, if not impossible, to achieve perfect bandwidths for the reflected signal reception throughout the band. A good antenna may have a 20 dB reflection coefficient or better.

From the foregoing, it is seen that there are at least two effects that create transmission leakage: one is from the directional coupler, and the other is from reflections received by the antenna. The combination of these two effects creates leakage that can be measured in conventional products from a transmitter to an isolation point.

As will soon become apparent, various embodiments described herein include circuitry, which may be used as post installation tuning circuitry, thereby compensating for the various reflections that will be present and/or change when or after the antenna is installed. Again, objects near the antenna tend to change the reflection of the antenna. Even a small amount of reflection would be very apparent to the receiver, even if the object causing the reflection is simply moving a few inches closer to the antenna. Accordingly, the circuitry described herein may be used to correct such effects on or of the antenna and/or the coupler. It follows that though the antenna and/or directional coupler may not be ideal for a given environment, various embodiments described herein allow tuning of the system for the environment in which installed, to reduce transmission leakage.

FIG. 1 is a circuit diagram for an isolation tuning circuit 100, in accordance with one embodiment. As an option, the present circuit 100 may be implemented in conjunction with features from any other embodiment listed herein, such as those described with reference to the other FIGS. Of course, however, such circuit 100 and others presented herein may be used in various applications and/or in permutations which may or may not be specifically described in the illustrative embodiments listed herein. Further, the circuit 100 presented herein may be used in any desired environment.

Referring now to FIG. 1, the circuit diagram illustrates a variable-capacitor-tuned isolation timing circuit 100 with a directional coupler 102. The directional coupler 102 has an input port (Port 1), an output port (Port 2), an isolation port (Port 3), and a coupling port (Port 4). Although not shown in FIG. 1, radio transmitting and receiving circuitry is preferably connected to the input and isolation ports Port 1, Port 3 respectively, of the directional coupler 102. According to various approaches, the radio transmitting and receiving circuitry may include a power amplifier; a low-noise amplifier (LNA); mixers; power detectors; use sensors, e.g., V detection, noise detection, etc.; etc.

Furthermore, the isolation tuning circuit 100 of FIG. 1 may be coupled to a controller of a type known in the art. Depending on the desired embodiment, a controller may be used to perform one or more operations, e.g. steps of a method, as will be described in further detail below.

Referring still to FIG. 1, the direction coupler 102 may be used, e.g., in an RFID reader, to combine the signal transmission and reception functionality into one antenna. The direction coupler 102 may have a coupling performance value in a range of about 3 to about 20 dB in some approaches, but may be higher or lower in others depending on the desired embodiment.

According to a preferred in use example, the transmit signal may be taken from the input port (Port 1) and directed to the antenna via the output port (Port 2). When a signal is being received by the antenna, the backscatter signal is directed to the coupler, which directs the backscatter signal to the isolation port (Port 3), which is coupled to the RFID reader's receive channel. Moreover, the transmitted signal passing through the input port (Port 1) should ideally not reach the isolation port (Port 3).

With continued reference to FIG. 1, the variable-capacitor-tuned isolation tuning circuit 100 additionally includes a tunable capacitor 106 is coupled in shunt with the output port (Port 2) of the directional coupler 102. An optional compensating inductor 108 may also be coupled in shunt with the output port (Port 2), e.g., to modify the impedance range of the antenna. In a preferred approach, the inductance value may be chosen to resonate with the tunable capacitor to align the middle value of its tuning range to the ideal antenna impedance, but is not limited thereto. Moreover, according to various approaches, the inductor 108 may include passive lumped components, distributed components such as open and short circuit transmission line stub having a certain electrical length, and/or combinations thereof.

A resistive terminator 104 is also coupled to the coupling port (Port 4) of the directional coupler 102. According to a preferred approach, the resistive terminator 104 may be electrically coupled to the coupling port (Port 4), e.g., using a lead, a wire, a cable, etc. Furthermore, although not shown, an antenna for both transmission and reception, or an antenna switch for coupling to one or more antennas, is preferably connected to the output port (Port 2) of directional coupler 102. The transmission to reception leakage ratio, or isolation, may preferably be measured as the insertion loss from the input port (Port 1) to the isolation port (Port 3).

The variable-capacitor-tuned isolation tuning circuit 100 further includes a second tunable capacitor 110 coupled in shunt with the termination resistor 112 at the coupling port (Port 4). An optional compensating capacitor 114 may also be used in series with the second tunable capacitor 110, e.g., to modify the overall admittance range. According to various approaches, the optional compensating capacitor 114 may include a capacitor of a type described and/or suggested herein. Moreover, the optional compensating capacitor 114 may include any capacitor which would be apparent to one skilled in the art upon reading the present description.

In a preferred approach, the two tunable capacitors 106, 110 may be adjusted to suppress the leakage that is introduced by any non-ideal antenna port reflection coefficient. According to an illustrative approach, the tunable capacitors 106, 110 may be sufficiently adjustable to correct an antenna reflection coefficient at various modulus by about 0° to about 360° phase range. Moreover, in another approach the tunable capacitors 106, 110 they may suppress the leakage that is introduced by the coupler and its supporting components including the shunt compensating inductor 108, the series compensating capacitor 114, the terminating resistor 112, and/or the cable voltage standing wave ratio (VSWR) variation including any environmental impacts on them.

The tunable capacitors 106, 110 may be of any type known in the art. According to various approaches, one or both of the tunable capacitors 106, 110 may include continuously tunable varactor diodes (varactor), micro-electromechanical systems (MEMS) based continuous tunable capacitors, digitally-controlled transistor-switched capacitor, etc. In one approach, tunable capacitors 106, 110 may include identical tunable capacitors. Alternatively, tunable capacitors 106, 110 may have different (e.g., individual) tuning ranges, as will be discussed in further detail below.

Figure 2:
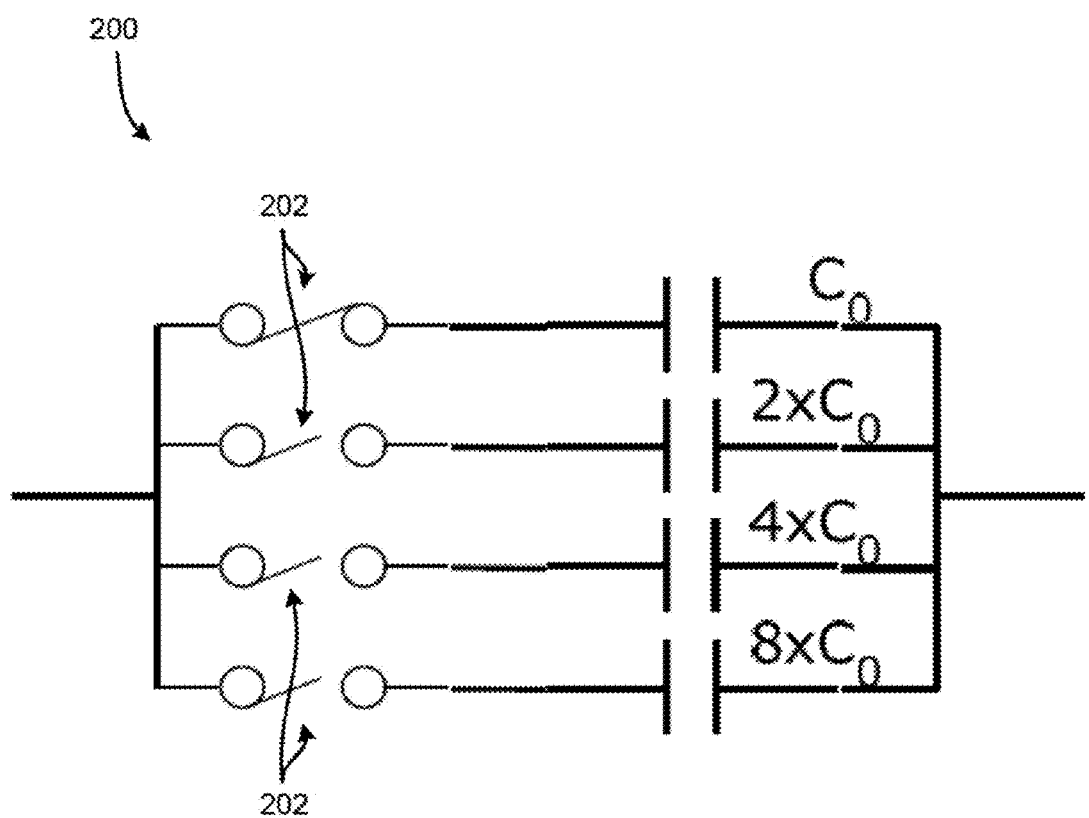
FIG. 2 is a circuit diagram of a parallel capacitor according to one embodiment.

In one illustrative approach, one or both of the tunable capacitors 106, 110 may include a group of capacitors enabled by selection of electronic switches as illustrated in FIG. 2.

FIG. 2 depicts a circuit 200, in accordance with one embodiment. As an option, the present circuit 200 may be implemented in conjunction with features from any other embodiment listed herein, such as those described with reference to the other FIGS. Of course, however, such circuit 200 and others presented herein may be used in various applications and/or in permutations which may or may not be specifically described in the illustrative embodiments listed herein. Further, the circuit 200 presented herein may be used in any desired environment.

Referring now to FIG. 2, the circuit diagram depicts a 4-bit digitally switchable parallel capacitor 200 according to an illustrative embodiment, which is in no way intended to limit the invention. Each of the switches 202 may be switchable, e.g., opened or closed, depending on the digital value of the 4-bits. e.g., between logical values 1 and 0, corresponding thereto. The switches may be of any type known in the art, such as transistors.

As illustrated in FIG. 2, the 4-bit digitally switchable parallel capacitor has a step size of $C_0$ and a range of $(0\sim15)*C_0$, e.g., $0, C_0, 2C_0, 3C_0, 4C_0 \ldots 15C_0$. For example, if all four of the switches 202 are closed (e.g., creating a connection), the total capacitance of the capacitor depicted in the circuit diagram 200 of FIG. 2 will be the sum of the capacitance of the four corresponding capacitors. Thus, the total capacitance would be $C_0+2C_0+4C_0+8C_0=15C_0$. However, according to another example, if only a first switch is closed while the other switches are open, e.g., as illustrated in FIG. 2, the total capacitance would equate to the capacitance value of the capacitor corresponding to the single closed switch. Therefore, looking to the embodiment depicted in FIG. 2, the total capacitance of the circuit diagram 200 is $C_0$.

Figure 3:
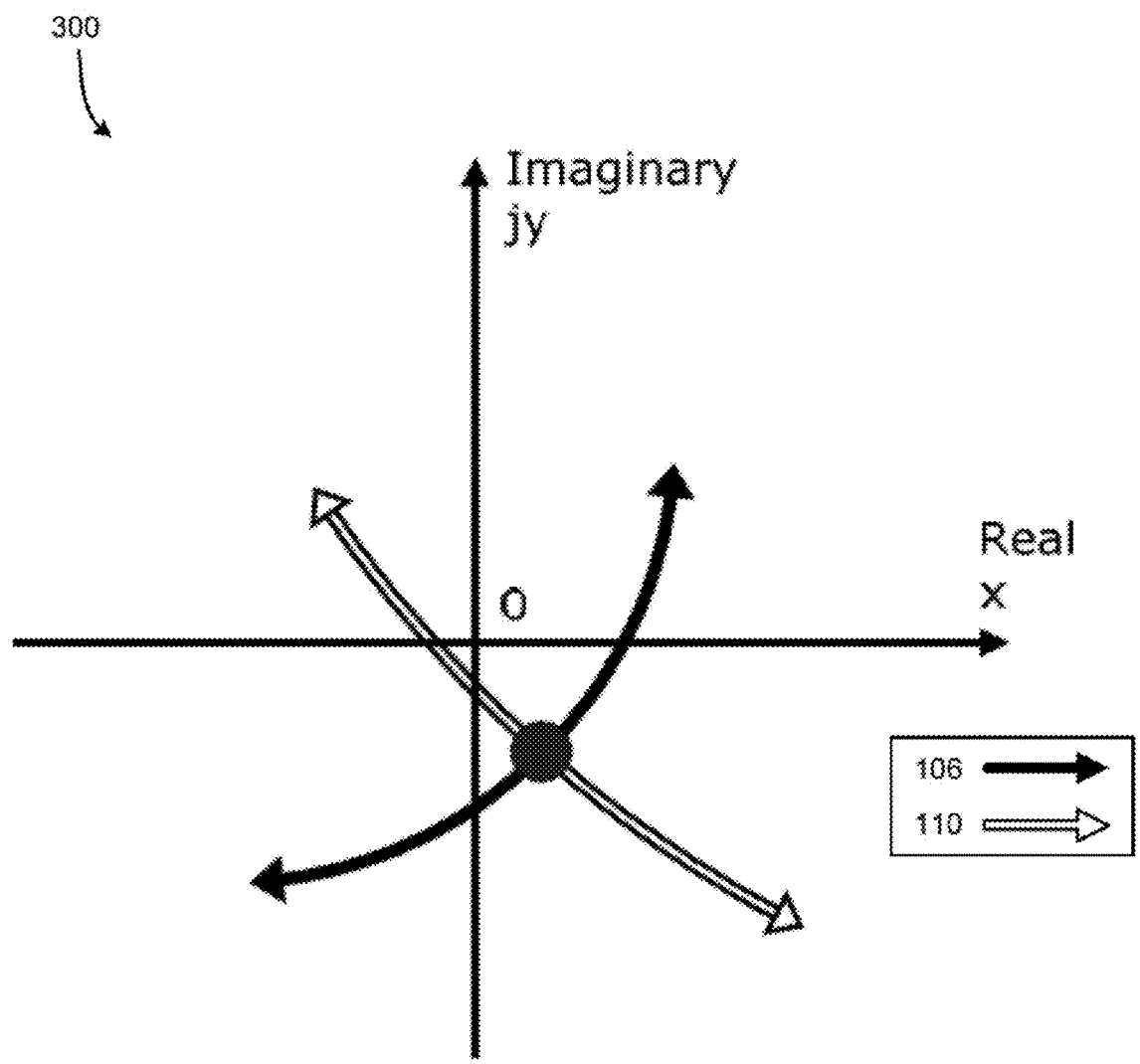
FIG. 3 is a graph depicting the complex transmission coefficient of tunable capacitors according to different embodiments.

The effect of the two adjustable, e.g., tunable, capacitors on the composite isolation (transmission leakage) between Port 1 and Port 3 of FIG. 1 are shown in the graph of FIG. 3 according to one embodiment. As an option, the present graph 300 may be implemented in conjunction with features from any other embodiment listed herein, such as those described with reference to the other FIGS. Of course, however, such graph 300 and others presented herein may be used in various applications and/or in permutations which may or may not be specifically described in the illustrative embodiments listed herein. Further, the graph 300 presented herein may be used in any desired environment.

Referring now to FIG. 3, the graph 300 represents the complex transmission coefficient (i.e., x+jy) from the transmit port (Port 1) to the receiving port (Port 3) of FIG. 1 as affected by adjustments made to the tunable capacitors 106, 110. According to one approach, adjustment of one and/or both of the tunable capacitors 106, 110 moves the transmission coefficient along the respective trajectories shown in the graph 300 of FIG. 3. The angle of the two trajectories depends on the phase difference between the transmission and coupling coefficients. A coupler with a 90° phase angle between the transmission coefficient and coupling coefficient is desirable in these approaches to efficiently utilize the tuning range of the variable capacitors. In other words, the 90° phase angle maximizes the area of the leakage trajectory in the graph 300.

From FIG. 3, it becomes apparent that by adjusting the tunable capacitors, the transmission leakage coefficients can be moved along both axes so that the intersection thereof is positioned towards the origin. The origin represents the zero leakage state, which may or may not be achieved due to the resolution of the tuning capacitor. The modulus achieved represents the leakage of the tuned coupler.

According to a further approach, coupling ratio of the directional coupler, the value of the parallel inductor 108 and/or series compensating capacitor 114 may be selected and/or tuned to ensure that the coverage area includes the origin of the coordinate system for a given antenna VSWR value. For example, the inductor 108 may be omitted if the value of capacitor 106 is small and its connection wire or grounding printed circuit board (PCB) through hole is selected to resonate with it. The tunable shunt capacitance on Port 2 and Port 4 of the directional coupler 102 may have different range requirement in order to cover a fixed antenna reflection modulus. In one approach, identical tunable capacitors may be used for capacitors 106 and 110, while a series compensating capacitor 114 may be used to modify the overall shunt impedance on the Port 4 of the directional coupler 102. Alternatively, the capacitor 114 may be omitted and instead, two capacitors with individual timing ranges may be implemented.

As noted above, the two tunable capacitors 106, 110 may be adjusted to correct an antenna reflection coefficient at various modulus from about 0° to about 360° phase. This large degree of control is also useful for compensating for effects induced by cabling. For example, antennas usually are connected by coax wires. The coax wires may induce some phase shift as well as a standing wave ratio, which is equivalent to flashing. The phase of the load also changes with different lengths of cable. Thus, the 360° timing is useful to compensate for different reflection phases associated with different lengths of cable. Moreover, a change in phase may be observed in a same length of cable, where the signal is at different frequencies. For example, the system may tend to observe a shorter electrical length at lower frequency, and a larger electrical length at higher frequency, on the same length of cable.

According to an illustrative embodiment, which is in no way intended to limit the invention, a method may be used for the calibration of an isolation tuner, e.g., as shown in FIG. 1, as follows. It should also be noted that any of the following method steps may be performed by a controller, e.g., of a type known in the art.

Figure 6:
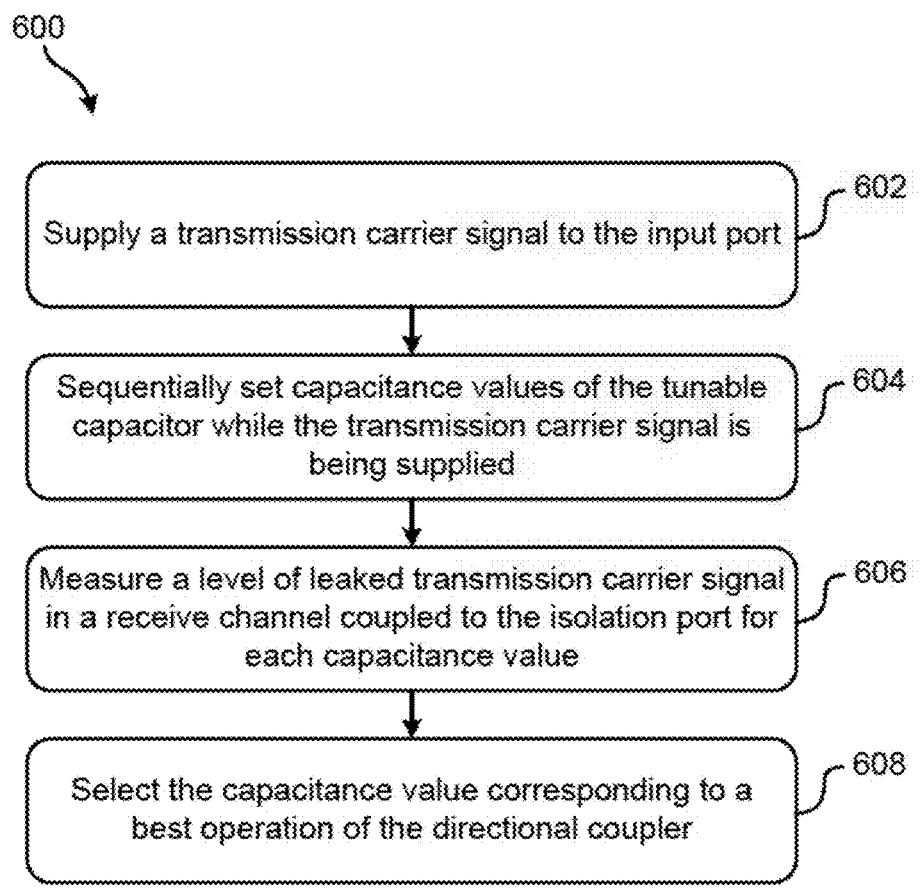
FIG. 6 is a flowchart of a method according to one embodiment.

FIG. 6 depicts a method 600 for calibrating a variable-capacitor-timed isolation tuning circuit, in accordance with one embodiment. As an option, the present method 600 may be implemented in conjunction with features from any other embodiment listed herein, such as those described with reference to the other FIGS, such as FIGS. 1, 4A-4C. Of course, however, such method 600 and others presented herein may be used in various applications and/or in permutations which may or may not be specifically described in the illustrative embodiments listed herein. Further, the method 600 presented herein may be used in any desired environment. Thus FIG. 6 (and the other FIGS.) should be deemed to include any and all possible permutations.

Referring now to method 600, operation 602 includes supplying a transmission carrier signal to the input port (Port 1) of the directional coupler. Depending on the desired approach, this transmission carrier signal may be a continuous wave and/or modulated. Method 600, further includes sequentially setting capacitance values of the tunable capacitor while the transmission carrier signal is being supplied. See operation 604. A micro-processor or other appropriate logic may be used to set the capacitance values depending on the desired embodiment. However, for embodiments having more than one tunable capacitor, e.g., two tunable capacitors, a micro-processor or other appropriate logic may be used to subsequently set the capacitance values of each of the more than one tunable capacitor.

Furthermore, operation 606 includes measuring a level of leaked transmission carrier signal in a receive channel coupled to the isolation port, e.g., see Port 3 of FIGS. 1, 4A-4C. According to different approaches, the measuring may be performed by the power detection and/or sensor circuitry. Moreover, it is desired that the level of leaked transmission carrier signal is measured for each capacitance value.

Further still, method 600 includes selecting the capacitance value corresponding to a best operation of the directional coupler. See operation 608. As mentioned above, for embodiments having more than one tunable capacitor, e.g., two tunable capacitors, the method includes selecting the capacitance values of the more than one tunable capacitor corresponding to a best operation of the directional coupler.

One or more of the steps of method 600 described above may be performed for each frequency of a plurality of transmitting frequencies. In one exemplary approach, after an RFID system is installed, a calibration procedure is performed in which the tunable capacitors are stepped through some and/or all possible combinations of capacitances, for each desired frequency of RFID operation, to achieve the best operation of the directional coupler. The best operation of the directional coupler may correspond to the lowest amount of detected transmission leakage. For each frequency, the selected capacitance settings, preferably providing the best performance of the directional coupler, may be stored in a table, database, etc., where the best operation corresponds to the lowest measured level of leaked transmission carrier signal. Thus, the combination of capacitance values may be selected at each frequency of a plurality of transmitting frequencies.

During normal operation, the stored setting may be retrieved and used when the system is operating in that particular frequency. For example, a device may use the stored capacitance values to set the capacitance value of one or more tunable capacitors during operation at the frequencies associated therewith.

Note that the system may be calibrated for each of a variety of operating and/or environmental conditions. Such conditions may be any condition that could affect the RF signal, such as temperature, whether a dock door is open or closed, etc. Thus, calibration may be performed upon detecting a change in temperature, e.g., an ambient temperature and/or a temperature of some component of the system. In one illustrative example, the system may perform a "warm weather" calibration to generate settings for use when a temperature reading is above a threshold, and a "cool weather" calibration to generate settings for use when a temperature reading is below a/the threshold.

As alluded to above, in one approach, the settings of the two tunable capacitors may be varied to determine at what point the power detector coupled to the isolation port (Port 3) detects the smallest signal. The power detector may be coupled directly to the isolation port may be positioned after a mixer, etc. Examples of power detectors may include a diode power detector, a log-amp driven diode detector, a local-oscillator-driven quadrature demodulator, etc. Furthermore, the values of capacitance corresponding to the lowest leakage power may be stored in memory for each particular carrier frequency. In different approaches, the value of capacitance corresponding to the lowest leakage power may be stored in a lookup table, controller, logic, computer program code, etc.

In another approach, a sensor may be used to detect the amount of leakage, rather than, or in addition to, a power detector. Any suitable sensor known in the art may be used. Examples include a voltage detector, a noise detection circuit, etc.

As noted above, during normal operation mode of the device, the micro-processor preferably recalls the value of each tunable capacitor corresponding to the particular operating frequency to be used. According to one approach, for frequency hopping transmitters, the value of the tunable capacitors may be updated at every change of transmitting frequency.

According to various approaches, a calibration procedure may be repeated after a time period; upon a request, e.g., from a user, logic, etc.; upon a condition being met; etc. Furthermore, if the frequency separations of transmitting signals are not significant to the bandwidth of the tuner and coupler, one set of tunable capacitor values may be used at several transmitting frequencies.

Figure 4A:
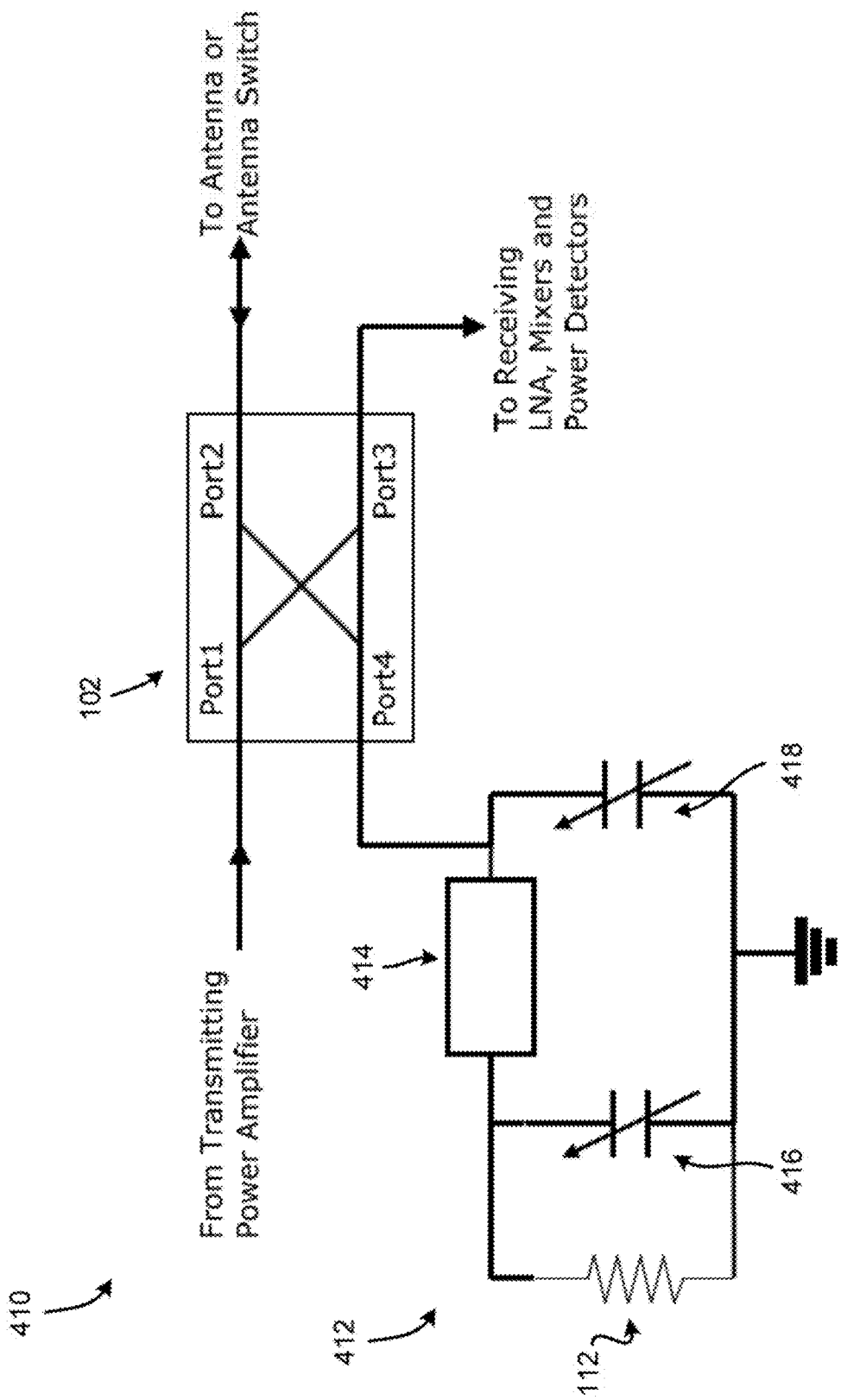
FIG. 4A is a circuit diagram of an isolation tuner according to one embodiment.
Figure 4B:
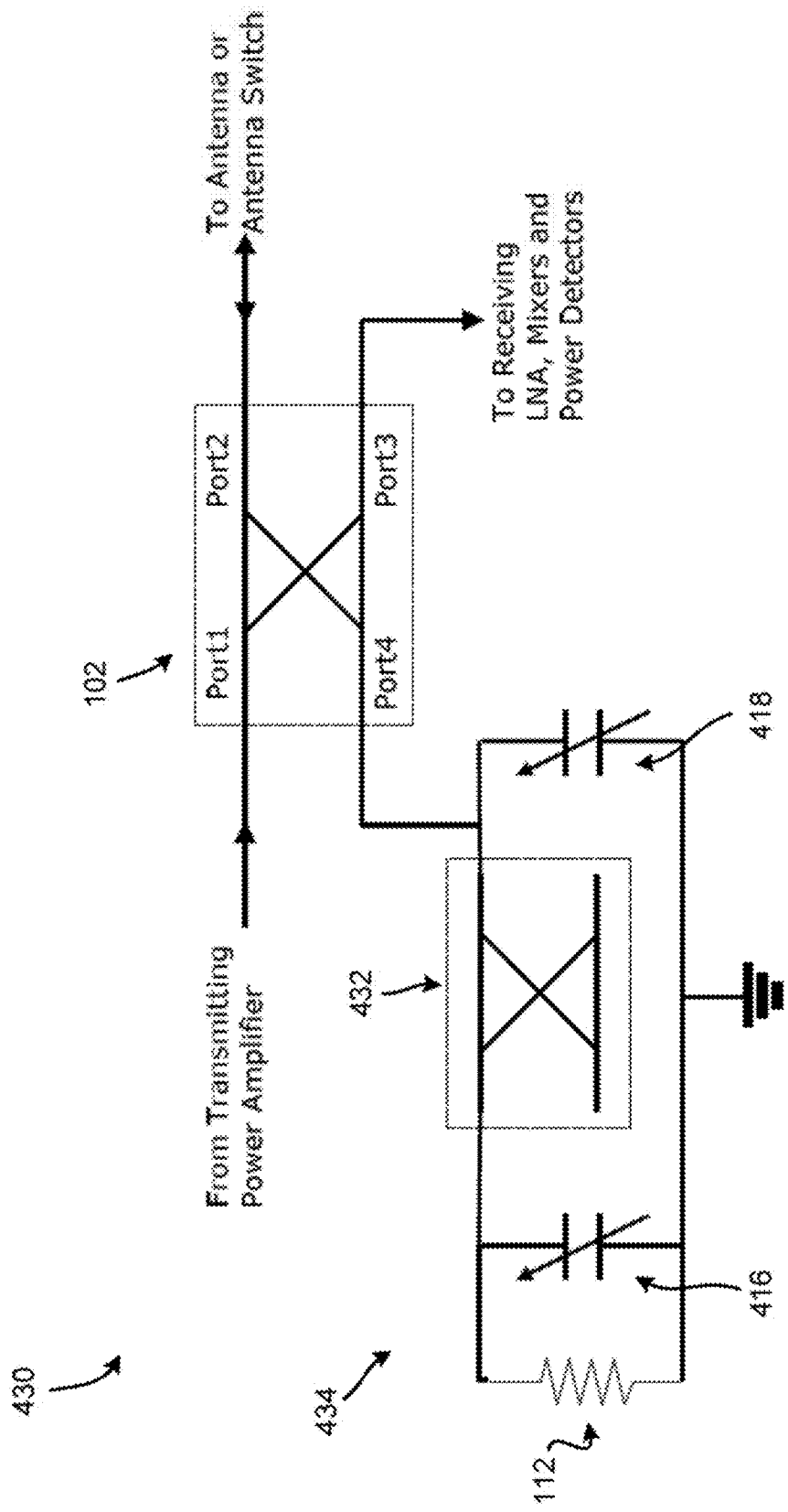
FIG. 4B is a circuit diagram of an isolation tuner according to one embodiment.
Figure 4C:
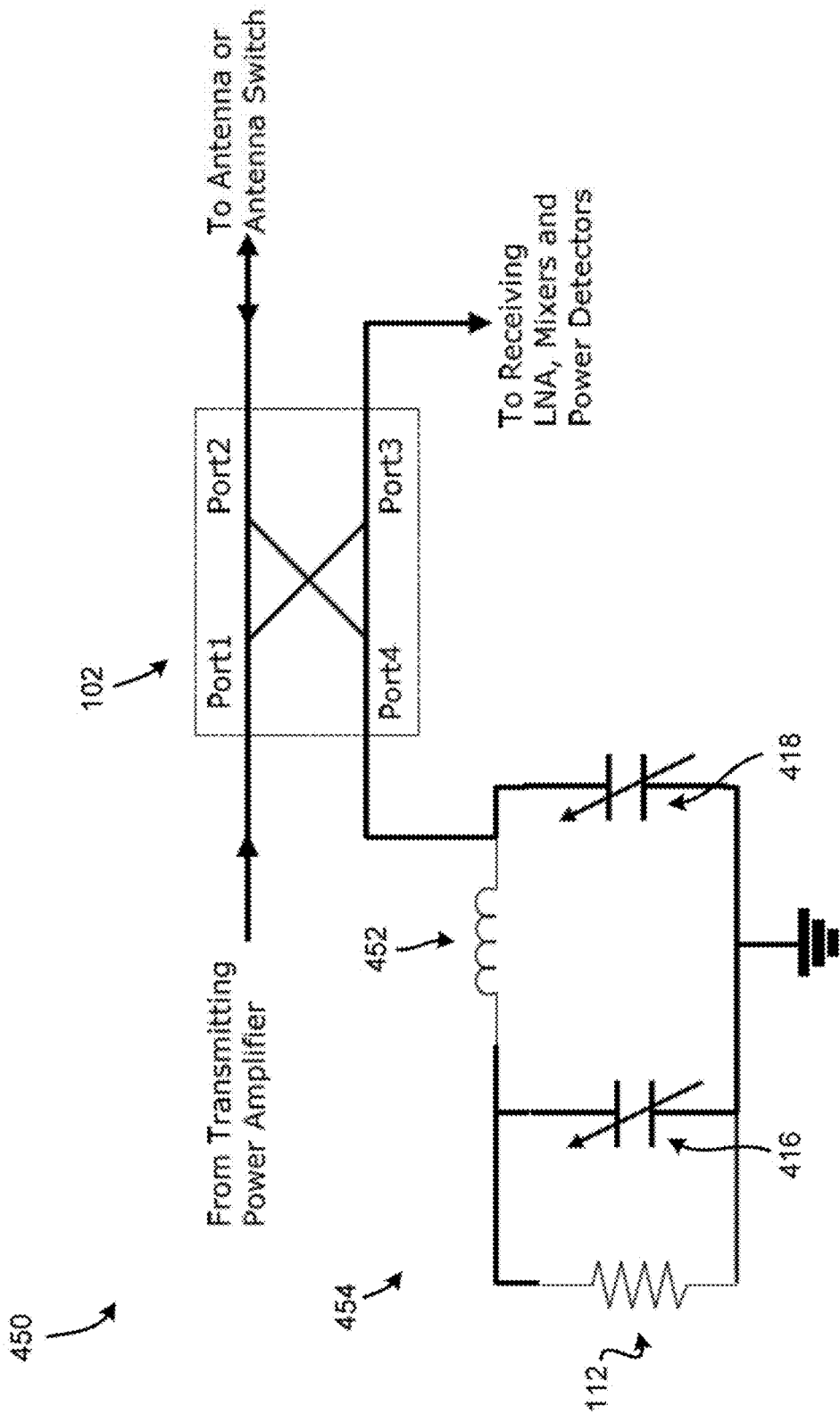
FIG. 4C is a circuit diagram of an isolation tuner according to one embodiment.

Alternate embodiments of isolation tuners are shown in the circuit diagrams of FIGS. 4A-4C. In general, components of FIGS. 4A-4C may be the same as, or similar to, like components described above, particularly termination resistor 112 and/or directional coupler 102, but are in no way limited thereto.

Referring now to FIG. 4A, a coupling port tuned isolation tuner using distributed tunable capacitors in a distributed matching circuit 412 is depicted. Circuit 410 is different from the circuit of FIG. 1 in that instead of a tunable capacitor being positioned on Port 2, two tunable capacitors 416, 418 are positioned on the termination point in addition to termination resistor 112. Tunable capacitors 416, 418 are coupled in shunt to the coupling port (Port 4) of the directional coupler 102. Furthermore, a 45 to 135 degree, preferably 90 degree, transmission line 414 is coupled between the two tunable capacitors 416, 418, which may be of any type known in the art, such as a printed microstrip transmission line.

As illustrated, the 90° transmission line 414, which separates the two tunable capacitors, preferably keeps the two transmission trajectories perpendicular, e.g., in order to efficiently utilize the range of the tunable capacitors 416, 418. The length of the 90 degree transmission line 414 may provide a phase delay or phase shift of 90 degrees in the frequency of interest.

Referring now to FIG. 4B, an isolation tuner 434 with distributed tunable capacitors 416, 418 and termination resistor 112 coupled to a second directional coupler 432 is illustrated. According to the present embodiment, the second directional coupler 432 is coupled between the tunable capacitors 416, 418.

According to a preferred approach, the second directional coupler 432 includes a 90° electrical length at the main signal path. Moreover, directional couplers with a 90° electrical length may have a smaller footprint than a 90° transmission line on a PCB. Therefore, the circuit 430 of FIG. 4B may have a smaller PCB size than the circuit 410 illustrated in FIG. 4A.

Referring now to the circuit 450 of FIG. 4C, a converter 454 with a series inductor 452 and two tunable capacitors 416, 418 in a Pi configuration is shown. In other words, the inductor is coupled between the two tunable capacitors 416, 418 in the present embodiment. The circuit 450 further includes termination resistor 112 coupled to the coupling port (Port 4) of the directional coupler 102.

Further reduction of circuit size may be achieved by replacing the 90° transmission line (see 414 of FIG. 4A) with an inductor 452 and tunable capacitors 416, 418, as depicted in FIG. 4C. Moreover, while the inductor 452 enables a 90 degree controlled phase and also a variation of the modulus, the size of the inductor 452 may be much smaller than a directional coupler with 90° electrical length.

In different approaches, the inductor 452 may include a lumped inductor, an on-chip spiral inductor, etc., or any other inductor described and/or suggested herein, depending on the desired embodiment.

Without wishing to limit the invention, the tunable capacitors illustrated in the embodiments of FIGS. 4A-4C may be subject to a lower transmitting power than those tunable capacitors of the illustrative embodiment depicted in FIG. 1. Moreover, in the embodiments corresponding to FIGS. 4A-4C, the tunable capacitors are only coupled to the coupling port (Port 4).

According to various approaches, at certain transmitting power levels, the tunable capacitors of any approaches described and/or suggested herein may be hot tuned, cold tuned, etc.

Many types of devices can take advantage of the embodiments disclosed herein, including but not limited to Radio Frequency Identification (RFID) systems (all Classes) and other wireless devices/systems; portable electronic devices such as portable telephones and other audio/video communications devices; and virtually any type of electronic device where an antenna is utilized. To provide a context, and to aid in understanding the embodiments of the invention, much of the present description shall be presented in terms of an RFID system such as that shown in FIG. 13. It should be kept in mind that this is done by way of example only, and the invention is not to be limited to RFID systems, as one skilled in the art will appreciate how to implement the teachings herein into electronics devices in hardware and, where appropriate, software. Examples of hardware include Application Specific Integrated Circuits (ASICs), printed circuits, monolithic circuits, reconfigurable hardware such as Field Programmable Gate Arrays (FPGAs), etc.

Figure 5:
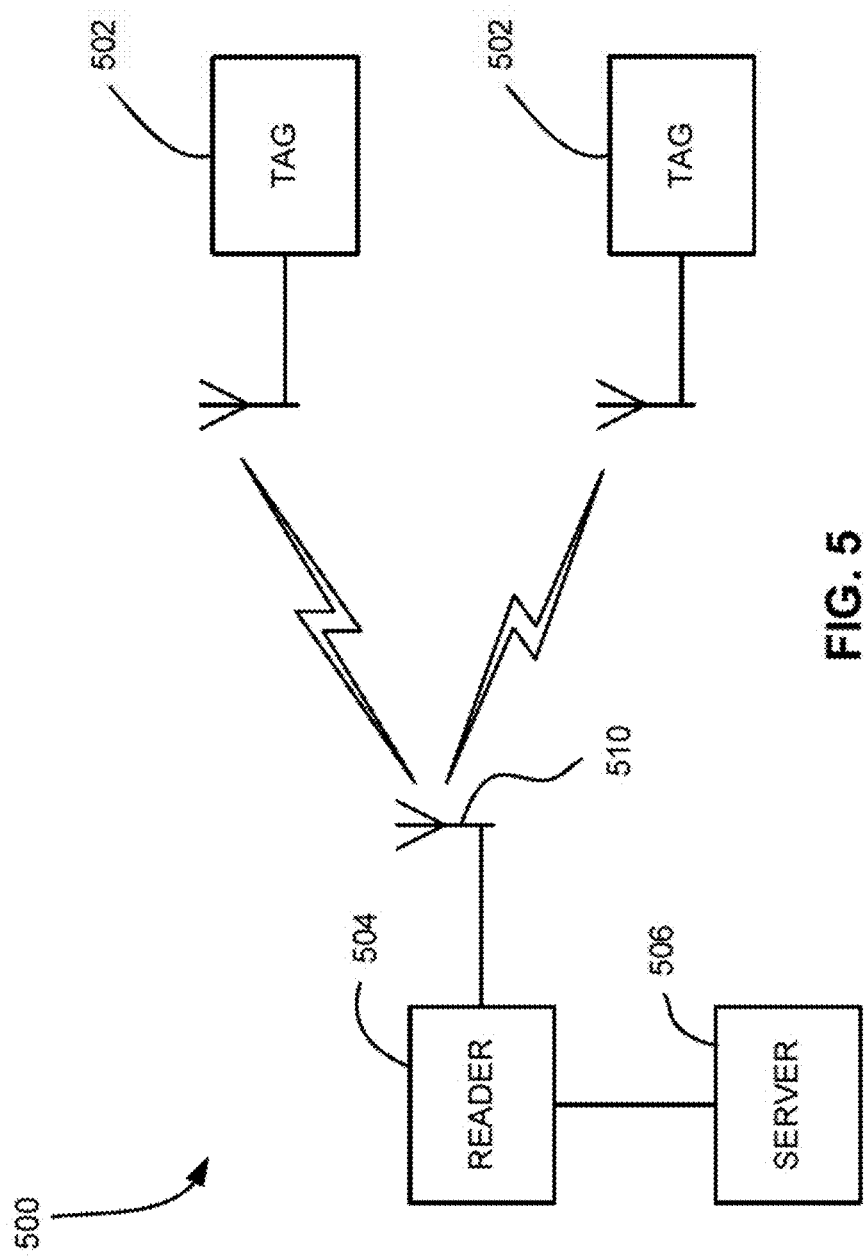
FIG. 5 is an RFID system according to one embodiment.

As shown in FIG. 5, an RFID system 500 includes RFID tags 502, a reader 504, and an optional backend system, e.g., server 506. Each tag 502 includes an IC chip and an antenna. The IC chip includes a digital decoder needed to execute the computer commands that the tag 502 receives from the tag reader 504. In some tags 502, the IC chip also includes a power supply circuit to extract and regulate power from the RF reader; a detector to decode signals from the reader; a backscatter modulator, a transmitter to send data back to the reader, anti-collision protocol circuits; and at least enough memory to store its EPC code.

Communication begins with a reader 504 sending out signals via an antenna 510 to find the tag 502. When the radio wave hits the tag 502 and the tag 502 recognizes and responds to the reader's signal, the reader 504 decodes the data programmed into the tag 502 and sent back in the tag reply. The information can then be passed to the optional server 506 for processing, storage, and/or propagation to another computing device. By tagging a variety of items, information about the nature and location of goods can be known instantly and automatically.

RFID systems may use reflected or "backscattered" radio frequency (RF) waves to transmit information from the tag 502 to the reader 504. Since passive (Class-1 and Class-2) tags get all of their power from the reader signal, the tags are only powered when in the beam of the reader 504. Class-3 and higher tags may include an on-board power source, e.g., a battery.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for calibrating a variable-capacitor-tuned isolation tuning circuit having a directional coupler having an input port, an output port, an isolation port, and a coupling port; and a tunable capacitor coupled in shunt to the coupling port of the directional coupler, the method comprising:
supplying a transmission carrier signal to the input port;
sequentially setting capacitance values of the tunable capacitor while the transmission carrier signal is being supplied;
measuring a level of leaked transmission carrier signal in a receive channel coupled to the isolation port, wherein the level of leaked transmission carrier signal is measured for each capacitance value; and
selecting the capacitance value corresponding to a best operation of the directional coupler.

2. The method as set forth in claim 1, wherein the best operation of the directional coupler corresponds to a lowest measured level of leaked transmission carrier signal.

3. The method as set forth in claim 1, wherein the method is performed for each frequency of a plurality of transmitting frequencies.

4. The method as set forth in claim 3, comprising storing the selected capacitance value for each frequency.

5. The method as set forth in claim 4, comprising using the stored capacitance values to set the capacitance value of the tunable capacitor during operation at the frequencies associated therewith.

6. The method as set forth in claim 1, wherein the method is performed when a change in temperature is detected.

7. A Radio Frequency transmitting device, comprising:
- a variable-capacitor-tuned isolation tuning circuit, comprising:
  - a directional coupler having an input port, an output port, an isolation port, and a coupling port; and
  - a tunable capacitor coupled in shunt to the coupling port of the directional coupler;
- a controller configured to:
- set a capacitance value of the tunable capacitor based on a frequency transmitted by the device;
- measure a level of leaked transmission carrier signal in a receive channel coupled to the isolation port, wherein the level of leaked transmission carrier signal is measured for each capacitance value; and
- select the capacitance value corresponding to a best operation of the directional coupler.

8. The device of claim 7, wherein the controller is configured to:
- supply a transmission carrier signal to the input port; and
- sequentially set capacitance values of the tunable capacitor while the transmission carrier signal is being supplied.

\* \* \* \* \*